(12) United States Patent
Mashburn

(10) Patent No.: US 8,360,708 B2
(45) Date of Patent: Jan. 29, 2013

(54) TELESCOPING TOOL BASKET, ESPECIALLY FOR OFFSHORE OPERATIONS, AND METHOD OF USING SAME

(76) Inventor: Benny Donald Mashburn, Lafayette, LA (US)

( * ) Notice: Subject to any disclaimer, the term of this patent is extended or adjusted under 35 U.S.C. 154(b) by 789 days.

(21) Appl. No.: 11/788,270

(22) Filed: Apr. 19, 2007

(65) Prior Publication Data

US 2007/0194018 A1 Aug. 23, 2007

Related U.S. Application Data

(62) Division of application No. 10/663,072, filed on Sep. 16, 2003, now abandoned.

(51) Int. Cl.
*B66F 11/00* (2006.01)
(52) U.S. Cl. .................. 414/746.8; 220/8; 211/208
(58) Field of Classification Search ............. 414/746.4, 414/139.4, 22.62, 745.1, 746.8, 785; 220/1.5, 220/8, 4.03, 4.09, 4.11, 475, 720; 224/500, 224/501, 320, 330, 550, 551, 552; 211/175, 211/208, 2, 88.02, 201, 195
See application file for complete search history.

(56) References Cited

U.S. PATENT DOCUMENTS

| | | | | |
|---|---|---|---|---|
| 2,877,602 A * | 3/1959 | Larsen | ........................ | 211/175 |
| 3,459,326 A * | 8/1969 | Betjemann | ..................... | 220/1.5 |
| 3,604,734 A | 9/1971 | Friedman et al. | | |
| 3,734,281 A * | 5/1973 | Armstrong | .................... | 206/321 |
| 3,744,659 A * | 7/1973 | Koehler | ............................. | 217/7 |
| 3,746,176 A * | 7/1973 | Kotlar | .......................... | 211/85.8 |
| 4,478,312 A | 10/1984 | Kurtgis | | |
| 4,714,169 A | 12/1987 | Keenan et al. | | |
| 5,054,426 A * | 10/1991 | Panarelli et al. | .............. | 119/473 |
| 5,154,310 A * | 10/1992 | Massey | ......................... | 206/505 |
| 5,445,278 A * | 8/1995 | Gearin et al. | ................ | 211/85.8 |
| 5,505,585 A * | 4/1996 | Hubbard | ....................... | 414/803 |
| 5,678,715 A * | 10/1997 | Sjostedt et al. | ................ | 220/1.5 |
| 5,909,816 A * | 6/1999 | Gearin et al. | ................ | 211/85.8 |
| 5,971,084 A * | 10/1999 | Dietzen | ........................... | 175/66 |
| 6,109,462 A * | 8/2000 | Emalfarb et al. | ............. | 211/119 |
| 6,213,319 B1 * | 4/2001 | Khachaturian | ............... | 212/270 |
| 6,422,405 B1 | 7/2002 | Haenszel | | |
| 6,575,686 B2 * | 6/2003 | Hagenzieker | .............. | 414/139.4 |
| 6,665,585 B2 * | 12/2003 | Kawase | ....................... | 700/226 |
| 6,685,585 B2 * | 2/2004 | Shishido et al. | .............. | 473/605 |
| 6,766,547 B1 * | 7/2004 | Lagassey | ......................... | 5/620 |
| 7,000,795 B2 | 2/2006 | Serden | | |
| 2002/0016211 A1 | 2/2002 | Moran | | |
| 2004/0206879 A1 | 10/2004 | Steyn et al. | | |

* cited by examiner

*Primary Examiner* — Saul Rodriguez
*Assistant Examiner* — Glenn Myers
(74) *Attorney, Agent, or Firm* — Jones Walker

(57) ABSTRACT

A telescoping, adjustable length tool basket, particularly suitable for offshore operations in the oil and gas industry. A center section has four elongated, tubular corner members, joined by bottom and side members. At least one, and preferably two, wing sections comprise elongated inner corner members that are slidably disposed within the outer corner members. The wing sections can be moved inwardly and outwardly from the center section to adjust the overall tool basket length to accommodate the tool length. When adjusted to the desired length, a lock pin is inserted through aligned holes in at least one pair of outer and inner corner members, to lock the tool basket at the desired length. Inner and outer bushings are disposed in the annulus between the inner and outer corner members. Preferably the bushings are of a polytetraflouroethylene (PTFE) material such as Teflon®.

4 Claims, 7 Drawing Sheets

TELESCOPING TOOL BASKET, ESPECIALLY FOR OFFSHORE OPERATIONS, AND METHOD OF USING SAME

This application is a Divisional Application based on U. S. Patent Application Ser. No. 10/663,072, filed on 16 Sep. 2003 now abandoned and entitled "Telescoping Tool Basket, Especially for Offshore Operations, and Method of Using Same".

BACKGROUND

1. Field of Art

This invention relates to apparatus and method used in connection with the loading/unloading and transporting of goods. In particular, this invention relates to a telescoping equipment or tool basket adapted to accommodate equipment and tools of differing lengths. The invention has particular, although not exclusive, application to operations connected with the oil and gas exploration, production, development, and transportation industries, especially offshore operations.

2. Related Art

While the present invention has broad and general application to the loading, unloading, and transportation of equipment to and from a variety of locations, as a matter of convenience (and not limitation) the invention and methods of its use will be described in connection with "offshore" operations related to the petroleum industry. Offshore operations, meaning those in ocean or inland waters, have become quite widespread. Drilling, production, development, and transportation operations are all included in offshore operations. Further, while the invention has applicability to both offshore and onshore operations, it has particular applicability to offshore operations, where equipment is transported by a vessel to/from a shore base and offshore work locations, and must be loaded/offloaded at both ends of the journey.

Equipment (commonly referred to as "tools") of various types and dimensions must frequently be transported back and forth from shore bases to offshore platforms, drilling rigs, and other offshore structures. Typically, the equipment is loaded into containers commonly known as "tool baskets," which are then picked up by a crane and placed onto a vessel to be brought offshore or to the shorebase, as the case may be. Tool baskets are typically elongated containers, with at least two sides and a bottom, with padeyes and the like to permit attachment of lift slings. Once the vessel has arrived at the desired location, a crane on the platform, drilling rig, etc. lifts the tool basket onto the offshore structure. Obviously, the procedure is reversed when tools are sent from an offshore location to a shorebase.

Problems arise in providing tool baskets that can accommodate various size (particularly as to length) tools that may be brought offshore. A common situation is the necessity to transport logging tools, which may be of different lengths, and some of which may be very long. While it is recognized that a closed end basket—one comprising not only a bottom and two sides, but also two ends, and of sufficient length that the tools fit entirely within the basket—is desirable, accommodating the differing tool lengths traditionally required an inventory of different length baskets. A solution in the past has been to provide tool baskets comprising a bottom and two sides only, that is to say are "open ended." Such tool baskets can of course accommodate many different lengths of tools, as those longer than the basket simply extend beyond the open ends of the tool basket.

However, potential dangers associated with lifts of loaded, open ended tool baskets can be readily appreciated. Particularly when loading and offloading vessels to/from offshore structures, heavy seas, winds and the like are sometimes experienced, with resulting vessel movement, swaying of loads, etc. For safety reasons, both as to personnel and equipment, it is desired to have closed end baskets in the sense that the baskets have four sides, to reduce the chances of equipment sliding out an open end, even though fastened via tie downs, etc. However, as previously described, that requirement leads to the need for multiple tool baskets of different lengths, so that the user has at his disposal a closed tool basket of an appropriate length for the tools to be placed therein. In addition to safety concerns, it is desirable to have a tool basket that supports the tool, over substantially its entire length. Very long, limber tools extending beyond a tool basket are in danger of being bent, broken, or otherwise damaged.

A solution to the requirement of having multiple fixed length baskets is a tool basket that can be telescoped to a desired length, preferably a length that closely matches the length of the tools. In addition, the telescoping structure must be quite robust, to withstand typically rough treatment in the offshore environment, yet one which is readily adjustable to the desired length.

SUMMARY OF THE INVENTION

This invention comprises a tool basket that is longitudinally telescopic to accommodate tools and equipment of differing lengths. A center section is generally rectangular in cross section, with elongated, tubular beams at each corner (outer corner members) running the length of the center section. The outer corner members are connected by bottom and side members (of either beam and/or solid sheet material) to form sides and a bottom. At least one wing section has similar elongated beams (inner corner members) which are disposed within the outer corner members of the center section, and which can be telescoped into and out of the center section outer corner members. Preferably, the tool basket has two substantially identical wing sections, one wing section telescoping from either end of the center section. The inner corner members of the wing sections are connected to one another at least near their ends distal from the center section, and in combination with the center section thereby form the tool basket. Internal and external bushings, preferably of a material such as Teflon®, are disposed in the annulus between the inner and outer corner members. The bushings maintain the wing sections properly aligned within the center section, reduce the force needed to telescope the wing sections into and out of the center section, and prevent water, trash and the like from getting into the annulus between the corner members. The present invention further comprises a method for handling and transportation of tools to and from offshore locations.

DESCRIPTION OF THE PRESENTLY PREFERRED EMBODIMENT

While those skilled in the relevant art field will recognize that various changes may be made to the particular embodiments disclosed, yet still fall within the scope of the invention, with reference to the drawings some of the presently preferred embodiments are now described.

Figure 1:
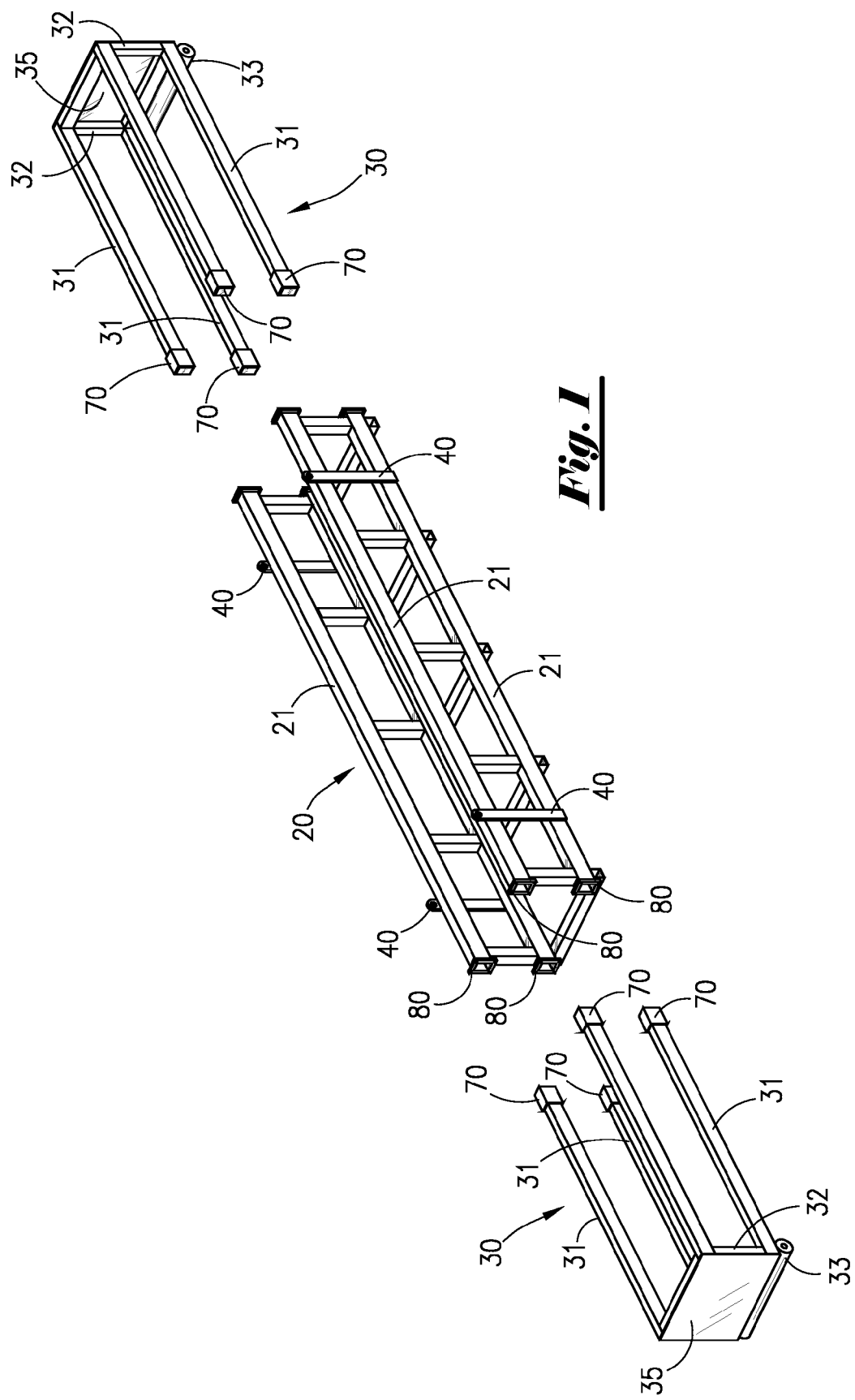
FIG. 1 is a perspective view of the overall tool basket, with the wing sections separated from (telescoped completely out of) the center section ("exploded view"), with some detail omitted for clarity.
Figure 1A:
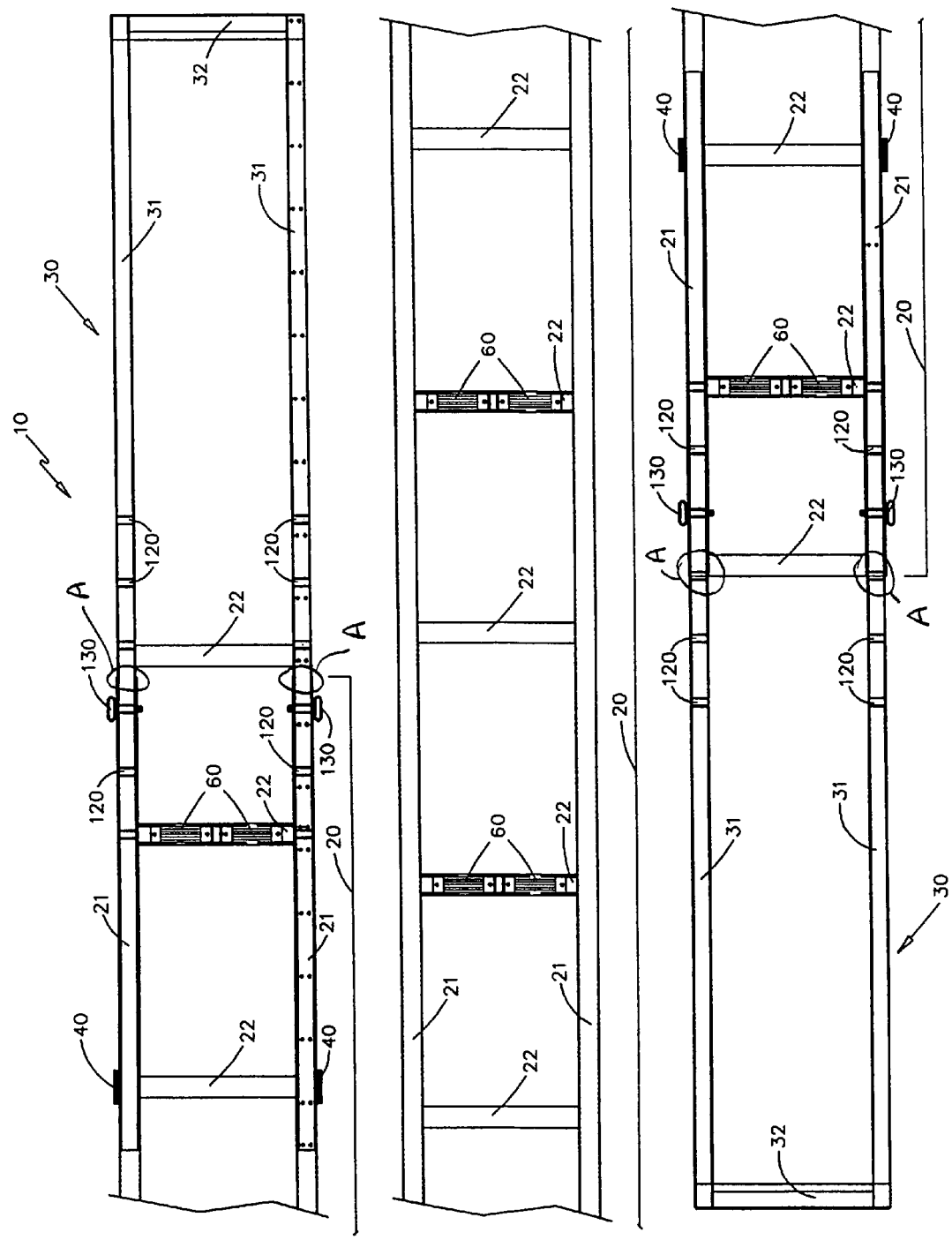
FIG. 1A is a more detailed, segmented top view of the tool basket.
Figure 2:
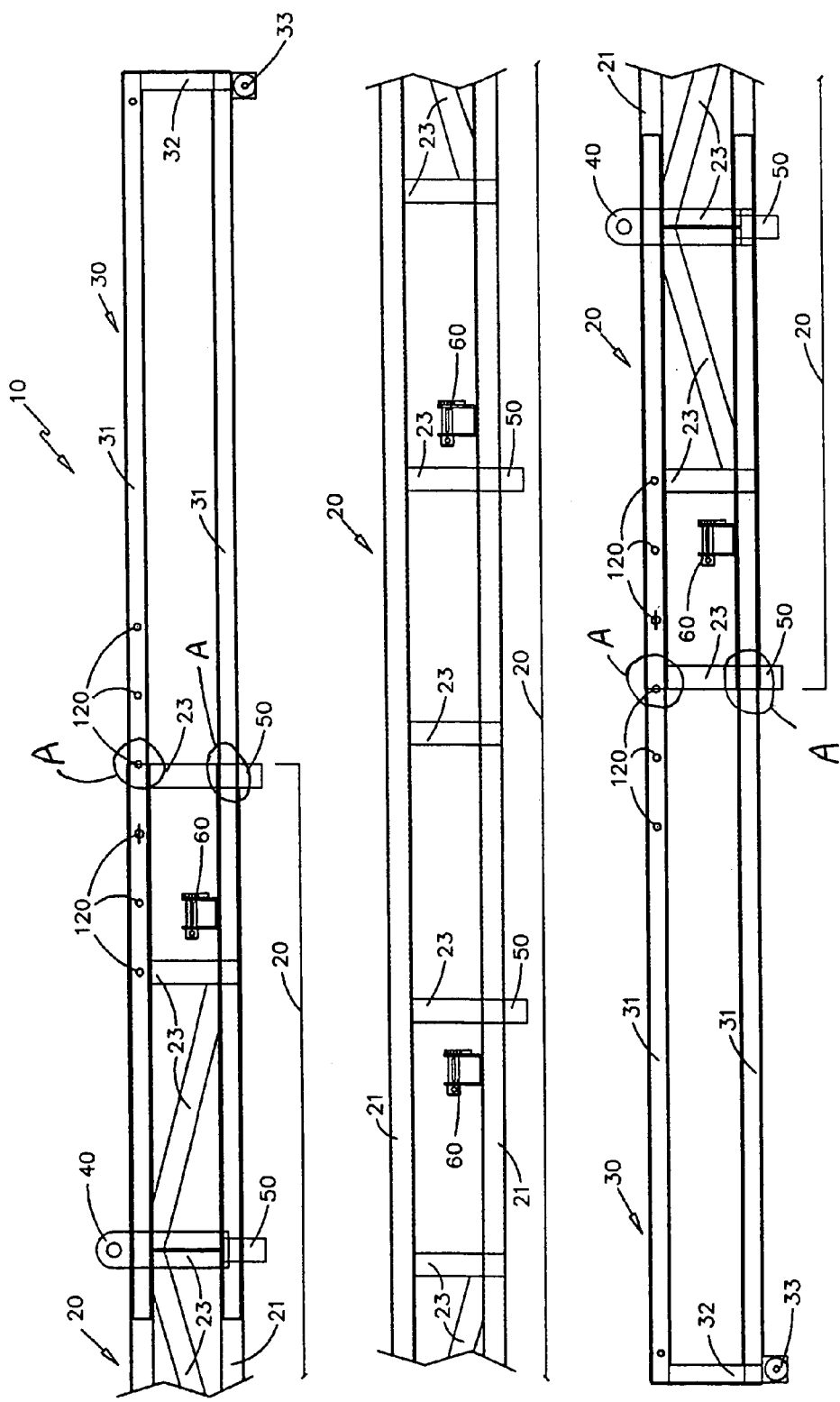
FIG. 2 is another side view of the tool basket.

Referring to the drawings, the apparatus of the present invention is a telescoping tool basket 10 comprising a center section 20 and at least one, and preferably two, wing sections 30. Center section 20 comprises four elongated, tubular outer corner members 21, overall forming a generally rectangular cross sectional shape. Each outer corner member 21 may have a circular, rounded square or rectangular, or other suitable cross sectional shape, typically with the inner profile closely matching the outer profile. In the embodiment shown, each outer corner member 21 has a generally square cross section shape (inner and outer). FIG. 1 is an overall perspective view of the tool basket, showing wing sections 30 completely pulled out of center section 20, in order to show how the sections fit together. Certain detail is omitted from FIG. 1 for purposes of showing a clearer overall view. FIGS. 1A and 2 are top and side views (segmented), showing more detail.

Outer corner members 21 are joined by bottom members 22 and side members 23, forming a bottom and sides for center section 20. In the illustrated embodiment, bottom and side members 22 and 23 are beam shaped members; however, it is understood that solid sheet members could be used in lieu of, or in addition to, the beam shaped members. With beam shaped members, an "open" construction is formed, while with sheet members 35, a "closed" construction is formed. Typically, padeyes 40 are fixed to center section 20 to permit lifting the tool basket via crane 200 (shown in Fig, 6) or otherwise. Skids 50 may be fixed to the bottom of center section 20, to somewhat elevate the tool basket above a flat deck or other surface on which it is resting.

With particular reference to FIGS. 1, 2, 4 and 5, wing section 30 is shown in more detail. Generally, wing section 30 comprises four elongated inner corner members 31 which are sized, shaped, and spaced apart so that each of inner corner members 31 are disposed within an outer corner member 21, when the wing section is mated with the center section. Inner corner members 31 are slidably disposed within outer corner members 21, so that wing section 30 may be telescoped into and out of center section 20, making the overall basket length shorter or longer as desired. While the scope of the present invention encompasses a tool basket having only one wing section 30, preferably two wing sections 30 are telescopically connected to center section 20, for a "symmetrical" tool basket as in FIGS. 1 and 2. The cross section shapes of the outer surfaces of inner corner members 31 generally conform to the inner cross section shape of outer corner members 21. The dimensions of the outer cross section of inner corner members 31 and inner cross section of outer corner members 21 are such that an annulus is formed therebetween, which can vary depending upon the size of the members but is generally on the order of ½". Inner corner members 31 are joined together generally near the end distal from center section 20, by bottom and side members 32. It can be appreciated from considering the drawings that bottom or side members in the wing sections must be limited to placement near the outer end of the wing section, otherwise the inner corner members would be blocked from telescoping into the outer corner members. In order to support wing section 30, and to ease telescoping of wing section 30, a roller 33 may be fixed to the bottom of wing section 30, typically near the end of wing section 30 distal from center section 20. Preferably, roller 33 is spaced so as to support wing section 30 at roughly the same elevation of center section 20 when supported by skids 50.

Figure 3:
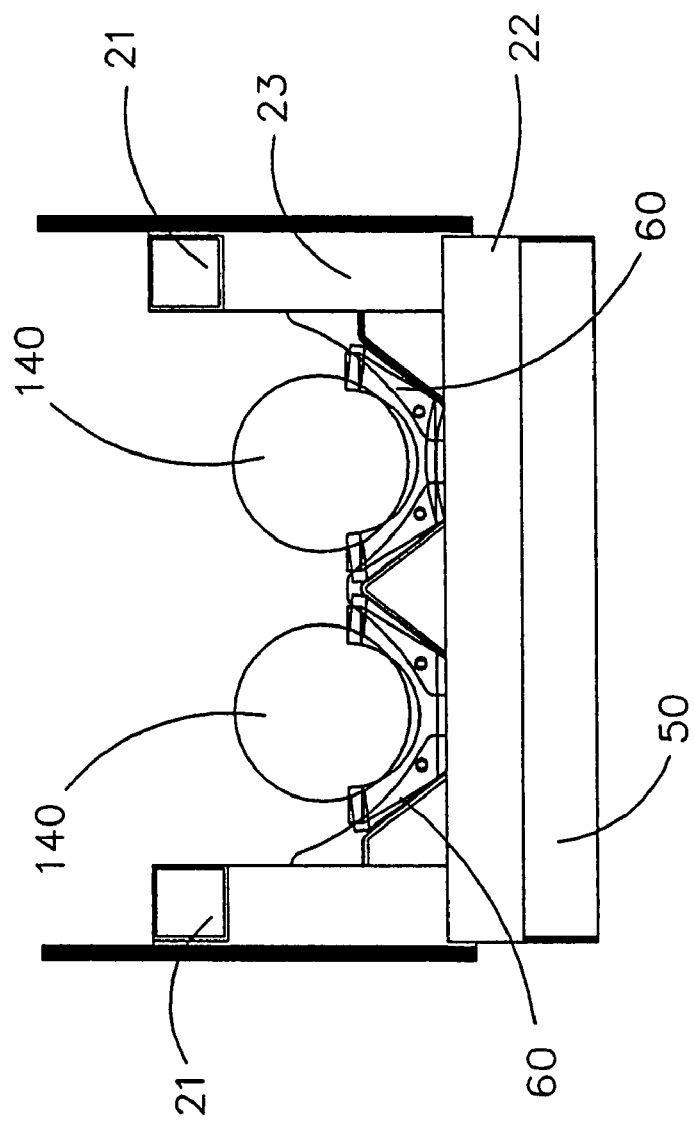
FIG. 3 is an end view, showing tools in place within the tool basket.

A plurality of tool cradles 60 may be provided in center section 20, to provide secure seating for tools placed within the tool basket. A typical arrangement of tools positioned in tool cradles 60 is shown in FIG. 3.

Figure 4:
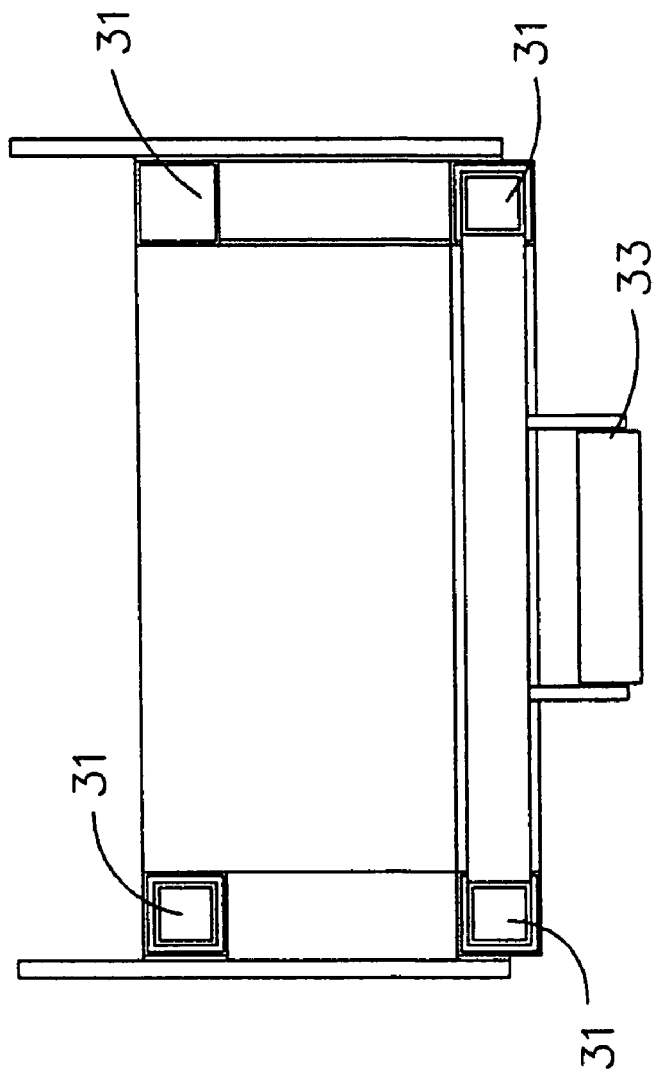
FIG. 4 is another end view, showing detail of the wing section.
Figure 5:
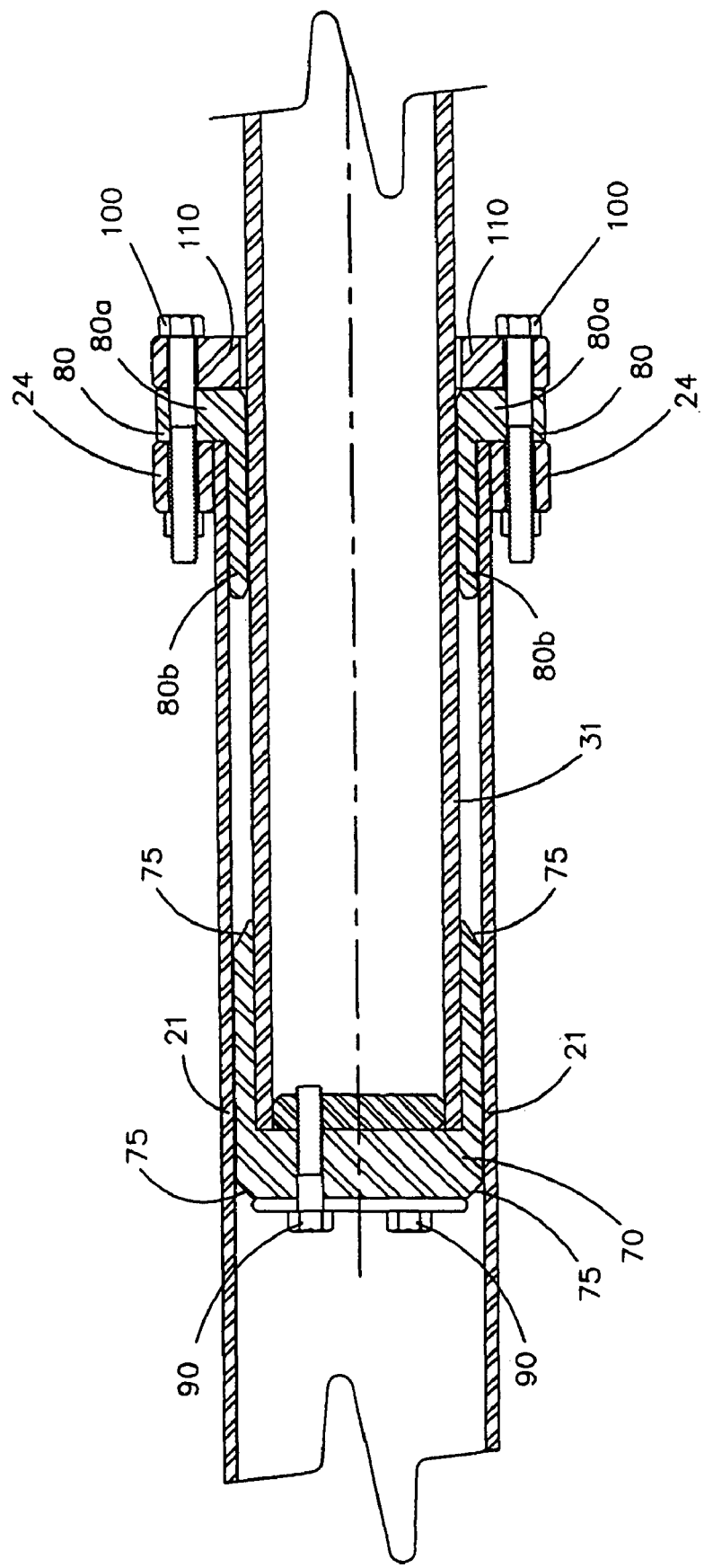
FIG. 5 is a more detailed view of the inner and outer bushings and inner and outer corner members.

FIG. 5 is a more detailed cross section view of the section of the equipment basket denoted by the circled sections labeled "A" in FIGS. 1A and 2, showing inner corner member 31 disposed within outer corner member 21 and of the bushing arrangement. In particular, inner and outer bushings 70 and 80 are shown in more detail. Inner bushing 70 is disposed on inner corner member 31 and moves back and forth with inner corner member 31, within outer corner member 21. In a presently preferred embodiment, inner bushing 70 is generally cap-shaped and fits around the end of inner corner member 31, and is fastened thereto via a fastening means, for example at least one bolt 90. As is seen in FIG. 4, inner bushing 70 extends a distance along inner corner member 31 in the annulus between inner corner member 31 and outer corner member 21. The leading and trailing edges 75 are preferably angled or rounded to help guide inner corner member 31 within outer corner member 21.

Outer bushings 80 are fixed to outer corner member 21, and extend into the annulus between the corner members. While different embodiments of the shape of outer bushing 80 are possible, a presently preferred shape comprises an outer collar 80a attached to a sleeve 80b extending into the annulus between the corner members 21 and 31. Outer corner member 21 has a flange 24, and a fastening means such as nut and bolt assembly 100 extend through a cap plate 110, outer collar 80a, and flange 24, and hold outer bushing 80 securely to outer corner member 21.

Inner and outer bushings 21 and 31 are preferably made of a polymer or elastomer material. One presently preferred material comprises polytetraflouroethylene (PTFE), for example material marketed under the brand name Teflon®. Teflon® has the beneficial characteristics of being very tough, resistant to corrosive fluids, oils, etc., yet being quite "slick" and providing a low-friction bearing surface. Wing sections .30 therefore can be telescoped into and out of center section 20 easily. While Teflon® or Teflon® containing materials are preferred, it is recognized that the scope of the present invention comprises inner and outer bushings of other elastomers, plastics, polyamides, composite materials, and metals such as brass. Inner and outer bushings 21 and 31 are sized so as to closely fit within the annulus between the corner members, thereby providing good support and alignment and preventing any significant trash from getting into the annulus, but not fit so tightly as to materially impede telescoping the corner members.

A means for locking the wing sections at a desired extension length from the center section is provided. One preferred means for locking comprises a plurality of mating holes 120 in outer and inner corner members 21 and 31. One or more lock pins 130 can be inserted through the holes 120, when holes 120 are aligned with the wing section at a desired extension length.

Materials, shapes, and dimensions of the various parts of the tool basket may be varied, as those skilled in the relevant art will recognize. Generally, structural steel is suitable for the primary structural members of the tool basket. The inner and outer bushings are preferably of an elastomeric material, as described above.

To use the tool basket, wing sections 30 are simply pulled out or pushed in to achieve a desired length, generally close to but slightly longer than the tools to be held; then, the overall length is adjusted to align holes 120, and lock pins 130 are inserted through at least a pair of aligned holes. Tools 140 can then be placed into tool cradles 60, and fastened down as appropriate. While for most applications each wing section 30 will be extended the same distance from center section 20, it is recognized that tools of an non-symmetric weight distribution (that is, with a center of gravity much closer to one end of the tool than the other end), may be better positioned with the wing sections each extended a different amount from the center section, so that while the tool may extend further from one end of the center section than the other end, the center of gravity of the tool will be roughly in the center of center section 20.

Figure 6:
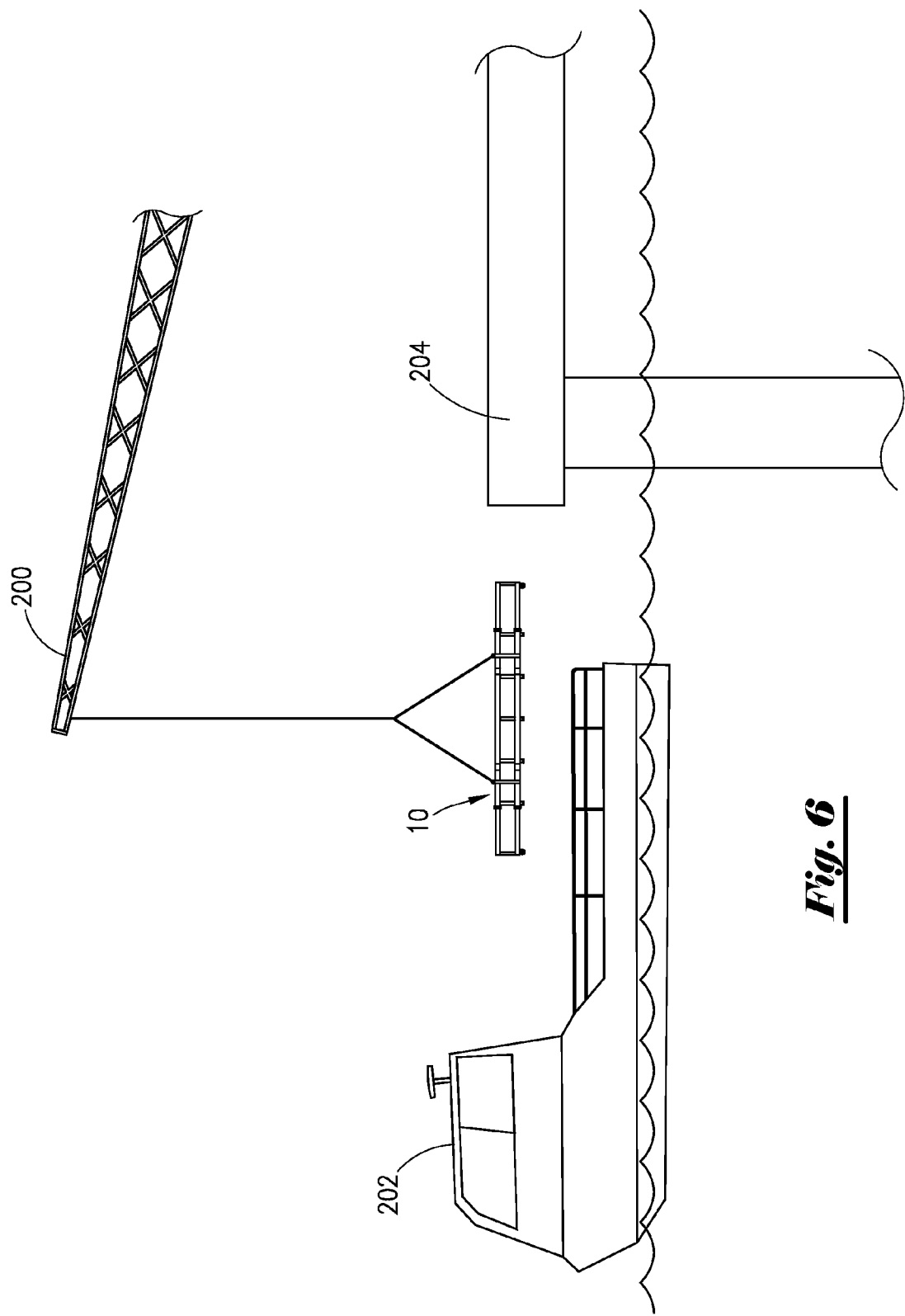

The present invention further comprises a method for loading, transportation, and unloading of equipment, particularly in offshore operations, comprising the steps of providing a tool basket having a center section and at least one telescoping wing section extending from the center section; adjusting the overall length of the tool basket to closely match the length of the tools to be carried; locking the wing section to the center section to form a tool basket of the desired overall length; placing the tools within the tool basket, and securing the tools within the tool basket as appropriate; and lifting the tool basket with tools therein, from a shore facility to vessel 202 (shown in FIG. 6), and/or from vessel 202 to offshore structure 204.

While the description presented herein sets forth a number of details of the invention, these are presented by way of example only and not limitation. Changes can be made to the disclosed, exemplary embodiments, as recognized by those with skill in the relevant art field, while not departing from the spirit of the invention. For example, the dimensions of the various parts of the tool basket can be changed to suit different applications; materials can be changed, for example steel, aluminum alloys, and other metals may be used; the shapes of the various components may be changed; the bottom and sides of the center section may be of structural beam type fabrication, or may be solid sheet material; and the inner and outer bushings may be of different shapes and materials.

Therefore, the scope of the invention is not to be measured by the disclosed embodiments, but by the appended claims and their legal equivalents.

I claim:

1. A method for handling an elongated tool in offshore operations, comprising the steps of:
   (a) providing a tool basket, the tool basket capable of being lifted by a crane and comprising: a center section, a first wing section, and a second wing section, said first and second wing sections being slidably affixed to said center section at opposite ends thereof, said center section comprising a front side wall, a back side wall, and a bottom wall, said front side wall and said back side wall each formed of at least two horizontally extending and parallel tubular outer corner members interconnected by a plurality of vertically extending and parallel side members, said bottom wall formed of a plurality of parallel bottom members interconnecting said front and back side walls, said first and second wing sections each comprising a front side face, a back side face, and an end face, said front and back side faces each formed of at least two horizontally extending and parallel inner corner members having a proximal end and a distal end, said end faces each formed of a top side member, a bottom side member and two interconnecting side members, said distal end of each of said inner corner members being affixed to one of said end faces, said proximal end of each of said inner corner members being slidably disposed within one of said tubular outer corner members of said central section, said front side and back side walls of said central section and said front, back and end faces of said first and second wing sections forming a continuous enclosure entirely around an outer periphery of said bottom wall, whereby said first and second wing sections can be telescoped inwardly and outwardly to adjust the length of said tool basket and wherein the first and second wing sections are selectively extendable from the center section to create a center of gravity of a weight of the tool within the center section: an inner bushing attached to said proximal end of each of said inner corner members and an outer bushing attached to each of said tubular outer corner members, a portion of both of said inner and outer bushings disposed in an annulus between said inner and outer corner members wherein the inner bushing comprises a cap over an end of the inner corner member disposed within the outer corner member and extending into the annulus, and wherein the outer bushing comprises a collar member and a sleeve extending into the annulus; a means for locking the first and second wing sections and the center section together; and a plurality of padeyes attached to the center section for lifting the tool basket;
   (b) adjusting said tool basket to accommodate a length or said elongated tool to be transported by telescoping said first and second wing section sections to a desired degree of extension from said center section to create the center of gravity of the weight of the tool within the center section; and
   (c) placing said elongated tool into said tool basket, and fastening said elongated tool within said tool basket.

2. The method of claim 1 further comprising the steps of:
   (d) transporting said tool basket on a vessel; and
   (e) lifting said tool basket from said vessel to an offshore structure with a crane.

3. The method of claim 2 wherein the step of placing the elongated tool into said tool basket includes placing the elongated tool onto a tool cradle, said tool cradle being disposed in said center section and adapted to receive said elongated tool.

4. The method of claim 1 wherein said means locking the first and second wing sections and the center section together includes a plurality of openings through at least a set of the telescoped inner and outer members of each of the first and second wing sections, a first pin inserted through one of the openings in the set of telescoped inner and outer members of the first wing section, and a second pin inserted through one of the openings of the telescoped inner and outer members of the second wing section, and the step of placing the elongated tool into said tool basket includes:
   (c3) inserting the first and second pins into the respective openings; and
   (c4) locking said first and second wing sections into the desired position.

* * * * *